US009276372B2

(12) United States Patent
Haensel et al.

(10) Patent No.: US 9,276,372 B2
(45) Date of Patent: Mar. 1, 2016

(54) LASER WITH NON-LINEAR OPTICAL LOOP MIRROR

(71) Applicant: Menlo Systems GmbH, Martinsried (DE)

(72) Inventors: Wolfgang Haensel, Munich (DE); Ronald Holzwarth, Groebenzell (DE); Ralf Doubek, Munich (DE); Michael Mei, Steinebach (DE); Martin Engelbrecht, Wunstorf (DE)

(73) Assignee: MENLO SYSTEMS GMBH, Martinsried (DE)

( * ) Notice: Subject to any disclaimer, the term of this patent is extended or adjusted under 35 U.S.C. 154(b) by 0 days.

(21) Appl. No.: 14/477,308

(22) Filed: Sep. 4, 2014

(65) Prior Publication Data
US 2015/0071322 A1    Mar. 12, 2015

(30) Foreign Application Priority Data
Sep. 6, 2013  (EP) .................................. 13183448

(51) Int. Cl.
*H01S 3/08*    (2006.01)
*H01S 3/11*    (2006.01)
*H01S 3/067*   (2006.01)
*H01S 3/00*    (2006.01)

(52) U.S. Cl.
CPC ........... *H01S 3/08059* (2013.01); *H01S 3/0092* (2013.01); *H01S 3/06791* (2013.01); *H01S 3/1112* (2013.01); *H01S 3/0057* (2013.01); *H01S 3/0064* (2013.01); *H01S 3/06704* (2013.01)

(58) Field of Classification Search
CPC ...... H01S 3/08059; H01S 3/0092; H01S 3/08
USPC ........................................................ 372/107
See application file for complete search history.

(56) References Cited

U.S. PATENT DOCUMENTS 5,050,183 A   9/1991 Duling, III
5,359,612 A  10/1994 Dennis et al.
5,513,194 A   4/1996 Tamura et al.
(Continued)

FOREIGN PATENT DOCUMENTS

EP    0 599 453 A1    6/1994
EP    1 847 804 A1   10/2007
(Continued)

OTHER PUBLICATIONS

European Search Report dated Dec. 13, 2013 (10 pages).
(Continued)

*Primary Examiner* — Tuan Nguyen
(74) *Attorney, Agent, or Firm* — Flynn, Thiel, Boutell & Tanis, P.C.

(57) ABSTRACT

In a laser (12, 18) with a laser resonator (13), the laser resonator (13) has a non-linear optical loop mirror (1, 1'), NOLM, which is adapted to guide counter-propagating portions of laser pulses, and to bring the counter-propagating portions of laser pulses into interference with each other at an exit point (4) of the NOLM (1, 1'). The non-linear optical loop mirror (1, 1') contains a non-reciprocal optical element (7, 7') on a linear section of the NOLM. In addition to the NOLM, the laser resonator (13) has a linear cavity section. The linear section of the NOLM and the linear cavity section (19) are reassembled on a microoptical bench (112) or within a cylindrical carrier (112).

20 Claims, 10 Drawing Sheets

(56) References Cited

U.S. PATENT DOCUMENTS

| | | | |
|---|---|---|---|
| 5,574,739 | A | 11/1996 | Carruthers et al. |
| 5,701,319 | A | 12/1997 | Fermann |
| 5,812,567 | A | 9/1998 | Jeon et al. |
| 6,034,770 | A | 3/2000 | Kim et al. |
| 7,817,684 | B2 | 10/2010 | Nicholson |
| 7,940,816 | B2 | 5/2011 | Nicholson |
| 2003/0058904 | A1 | 3/2003 | Krainer et al. |
| 2007/0230882 | A1* | 10/2007 | Hainberger ............... 385/122 |
| 2008/0180681 | A1* | 7/2008 | Digonnet .................. 356/477 |

FOREIGN PATENT DOCUMENTS

| | | | |
|---|---|---|---|
| EP | 2 251 642 A2 | 11/2010 | |
| JP | 06-283785 A | 10/1994 | |
| JP | 08-334800 A | 12/1996 | |
| JP | 09-139536 A | 5/1997 | |
| JP | 2002-094155 A | 3/2002 | |
| JP | 2003-035603 A | 2/2003 | |
| JP | 2010-022042 A | 1/2010 | |
| JP | 2010-062568 A | 3/2010 | |
| JP | 2010-510660 A | 4/2010 | |
| WO | WO 95/25367 | 9/1995 | |

OTHER PUBLICATIONS

*Accordable Repetition Rate Hybrid-Type Mode-Locked Fiber Laser*, by F. Bahloul et al, Communications, Computing and Control Applications (CCA), 2011 International Conference on, IEEE, 2011, pp. 1-3.

*Additive Pulse Mode-Locked Erbium Doped Fiber Lasers*, by K. Tamura, Massachusetts Institute of Technology, 1994, 169 pgs.

*All-Normal Dispersion, Figure-Eight, Tunable Passively Mode-Locked Fiber Laser with an Invisible and Changeable Intercavity Bandpass Filter*, by X. H, Li et al, Laser Physics, Nauka/Interperiodica, vol. 21, No. 5, 2011, pp. 940-944.

*All-Optical Regeneration of Polarization Division Multiplexing Signals in Polarization Nonlinear Loop Mirror*, by A. Yi et al, Optics Communications, vol. 284, No. 14, 2011, pp. 3619-3621.

*Cavity Dumping of Fiber Lasers by Phase-Modulated Optical Loop Mirrors*, by O.G. Okhotnikov et al, Optics Letters, The Optical Society, 1996, vol. 21, No. 1, 1996, pp. 57-58.

*Environmentally Stable Kerr-Type Mode-Locked Erbium Fiber Laser Producing 360-fs Pulses*, by M.E. Fermann, Optics Letters, vol. 19, No. 1, 1994, pp. 43-45.

*Passive Mode-Locking in a Laser with a Nonreciprocal Nonlinear Loop Reflector*, by A.G. Bulushev et al, Soviet Technical Physics Letters, American Institute of Physics, vol. 16, No. 6, 1990, pp. 437-439.

*Passively Modelocked Self-Starting Figure-Eight Fiber Laser with Semiconductor Optical Amplifier*, by Seong-sik Min et al, Joint Conference of the Opto-Electronics and Communications Conference (OECC) and The Australian Conference on Optical Fibre Technology (ACOFT), 2008, Sydney, Australia, pp. 1-2.

Chinese Office Action dated Dec. 3, 2014 with partial English translation thereof (9 pages).

\* cited by examiner

LASER WITH NON-LINEAR OPTICAL LOOP MIRROR

FIELD OF THE INVENTION

The invention relates to a laser with a laser resonator, the laser resonator comprising a non-linear optical loop mirror, NOLM. The NOLM is adapted to guide counter-propagating portions of laser pulses, and to bring the counter-propagating portions of laser pulses into interference with each other at an exit point of the NOLM. In the context of the present invention, the term NOLM is construed to comprise NALMs, i.e. non-linear amplifying loop mirrors.

DESCRIPTION OF THE RELATED ART

Generally, for generation of ultra short pulses it is required to have a fixed phase relation between the modes of the laser that contribute to the output. This phase relation is fixed by mode locking the laser. There are different methods to mode lock a laser. They all rely on the fact that an element is built into the laser that favors the transmission of pulses, i.e. has higher losses for cw operation than in pulsed operation.

The most commonly used methods for passive modelocking in fibre lasers use
  a) saturable absorbers,
  b) non-linear polarisation rotation or
  c) non-linear fibre loop mirrors.

Method (a) is cumbersome because it relies on a comparatively slow process, which enhances frequency and amplitude noise in the laser. A saturable absorber made e.g. from semiconductor material or carbon nano tubes is a very delicate device that is easily destroyed by applying too much optical power and which in many cases is subject to degradation, limiting the life time of such a system.

Methods (b) and (c) are preferred for lower noise applications, as they both rely on the optically fast Kerr effect. They both fall into the domain of additive pulse modelocking (APM).

Method (b) on the other hand is cumbersome because it uses non polarisation maintaining (non PM) fibres. Therefore, the polarisation state and the mode locking performance depend on environmental influences such as temperature and also on the way the fibre is bent. This makes it difficult to operate such a laser independent of environmental changes over extended periods of time.

Figure 9:
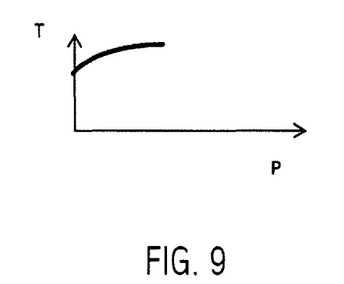
FIG. 9 shows a nonlinear transmission curve desirable for a mode coupling element in a passively mode locked laser to allow self-starting of pulsed operation.

Methods (a) and (b) provide good self-starting. This is due to the fact that the roundtrip transmission for light in the laser cavity without amplification exhibits a typical shape at very low peak power, shown in FIG. 9 as transmission (T) over circulating peak power (P). In particular, at zero peak power P, the intensity-dependent transmission T has a non-zero value and, more importantly, shows a non-vanishing slope, which facilitates the build-up of pulses from noise at low power.

In the past, method (c) was cumbersome, because the laser was not self-starting or only with massive effort of using additional active modulators. Such an active modulator, which is incorporated in the laser resonator and has to be switched off after the laser starts pulsing, is disclosed in U.S. Pat. No. 7,817,684 B2. In general, such a laser comprises not only a NOLM, but also a second loop as well as a laser gain medium in either or both of the two loops.

The conventional figure-eight configuration of method (c) does not naturally have an intensity-dependent transmission with a non-vanishing slope at zero power. Instead the transmission function exhibits the shape shown in FIG. 10. The transmission is an oscillatory function of the differential phase shift $\Delta\phi_{Kerr}$ between clockwise (cw) and counterclockwise (ccw) propagating pulses in the NOLM loop. This phase is proportional to the peak power of the circulated pulse and strongly depends on the asymmetry of the loop. Loop asymmetry can be caused by non-symmetrical insertion of loss or gain elements or an asymmetric loop coupler. In the latter case, only a partial modulation is achieved (dashed line in FIG. 10).

Typical implementations of figure-eight fibre lasers are with single mode fibre, offering two parallel modes of propagation. This provides a way to induce a linear (i.e. intensity-independent) phase shift between clockwise (cw) and counterclockwise (ccw) propagating pulses by appropriately controlling the polarisation in the non-linear loop. Such polarisation control in figure-eight lasers is disclosed in U.S. Pat. No. 5,050,183 and U.S. Pat. No. 7,940,816 B2.

These documents show that pulsed laser sources relying on a NOLM (non-linear optical loop mirror) or specifically a NALM (non-linear optical amplifying loop mirror) as modelocking mechanism are typically based on a figure-eight geometry and are well established for bulk implementation and for non-polarisation maintaining fibres.

One object of the invention is to improve the self starting properties of a laser with a non-linear optical loop mirror. A further object of the invention is to provide an environmentally stable laser operation over a wide range of laser parameters.

These objects are solved with the features of the present invention. Advantageous embodiments of the invention are also referred to in the following description.

SUMMARY OF THE INVENTION

According to the invention, a non-reciprocal optical element is introduced into the laser resonator. In this context, "non-reciprocal" means that the effect of the optical element on light passing through depends on the direction of propagation of this light. This effect could influence e.g. the amplitude, the phase, the polarisation and/or the frequency of light passing through the non-reciprocal optical element. More specifically, the invention teaches to incorporate this non-reciprocal optical element into a non-linear optical loop mirror, NOLM, which is adapted to guide counter-propagating portions of laser pulses, and to bring the counter-propagating portions of laser pulses into interference with each other at an exit point of the NOLM, i.e. to place the non-reciprocal optical element into the bi-directional NOLM. This is in contrast to prior art figure-eight laser configurations, which do not contain a nonreciprocal element in the NOLM, but only in the form of an isolator in the unidirectional loop.

Figure 10:
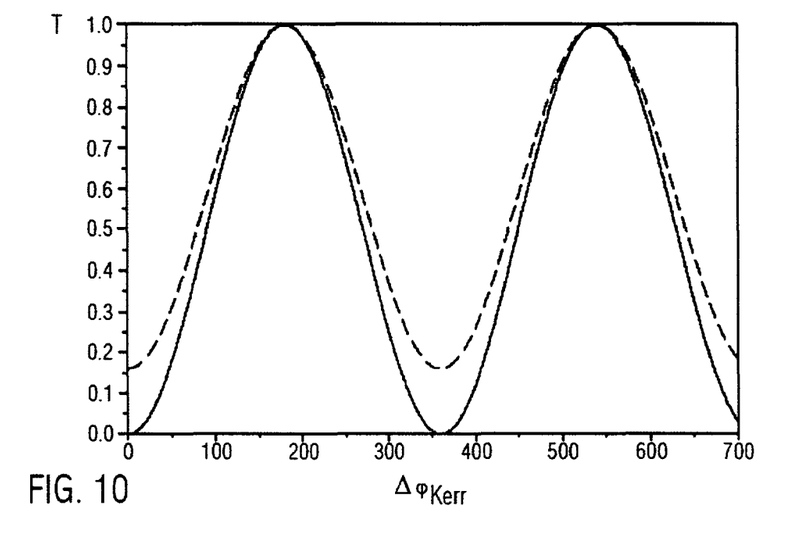
FIG. 10 shows a transmission curve of a conventional laser with an NOLM.

The effect of the non-reciprocal optical element in the NOLM is to modify the conventional transmission function, which had been shown in FIG. 10, for example by introducing a non-reciprocal phase offset or a non-reciprocal loss on behalf of the counter-propagating portions of laser pulses. The transmission function indicates the transmitted laser power at the exit point of the NOLM, which is influenced by interference between the counter-propagating portions of laser pulses. By the non-reciprocal optical element in the NOLM, the transmission function is intentionally shifted by an appropriate amount to the left (or right), so that the value of the transmission function at zero power is non-zero and has a non-vanishing slope. Hence, as described with respect to FIG. 9, this laser exhibits superior self-starting properties.

The present invention is especially useful for mode locked fibre lasers or wave guide lasers, but not limited to such lasers.

The laser according to the invention comprises a linear cavity section in addition to the bi-directional NOLM. In this embodiment, the laser obtains a figure-nine configuration. Compared to a figure-eight configuration, the figure-nine configuration offers specific advantages, in particular with respect to its adaptability. For example, the back reflection within the linear cavity section may be used to selectively introduce or remove additional optical elements such as filters or dispersion compensators. This is facilitated if the linear cavity section is a free space section. The NOLM may be configured as a NALM, i. e. with an amplifier.

Further, the NOLM comprises a loop section as well as a linear section on which the laser pulse portions counter-propagating through the loop section travel collinearly, with the non-reciprocal optical element being arranged on the linear section of the NOLM. This offers the advantage of the counter-propagating pulse portions crossing the non-reciprocal optical element twice during their transit through the NOLM, thereby leading to an enhanced non-reciprocal influence on the laser pulse portions.

Further, a key feature of the present invention is that at least some or all of the optical components of the linear section of the NOLM, and/or of the linear cavity section outside the NOLM, are jointly assembled in the form of micro optical elements. This can be done by assembling these components on a common micro bench, for example on a ceramic substrate, or by assembling them in a common cylindrical carrier. Assembling the optical components in this way in the form of micro optical elements offers the advantage of an extremely compact, robust design of the laser.

Preferably, the linear cavity section of the laser outside the NOLM, and the linear section of the NOLM are collinear with each other. Both may be configured in the form of free space optics, i. e. without fiber sections between their optical elements.

The micro bench or the cylindrical carrier, on or within which the micro optical elements are assembled, may have a length between 0.5 cm and 10 cm, between 4 cm and 7 cm, preferably about 5 cm. If a cylindrical carrier is provided, it may have an internal or external diameter of 5 mm to 12 mm, or between 6 mm and 10 mm, preferably about 8 mm. The cylindrical carrier may comprise stainless steel or glass. The micro optical elements may be mounted on the micro bench or within the cylindrical carrier by using an adhesive curing under the influence of ultra violet light.

Due to its very compact size, the laser resonator may achieve very high repetition rates, for example 150 MHz or higher, or even 250 MHz or higher. On the other hand, lower repetition rates may be achievable while still maintaining a rather compact size, by providing several windings of the optical fiber within the loop section of the NOLM.

Preferably, as already indicated above, the non-reciprocal optical element comprises a non-reciprocal loss element and/or a non-reciprocal phase shift element. A non-reciprocal phase shift element would directly introduce a non-reciprocal phase difference between the counter-propagating portions of laser pulses, while a non-reciprocal loss element changes the symmetry of the NOLM and thereby modifies the contrast and the intensity dependence of the relative phase shift.

In a preferred embodiment, the NOLM comprises at least one polarisation maintaining optical fibre, or is made in general from polarisation maintaining (PM) optical fibres or waveguides. The use of a a PM fibre has the advantages of guaranteeing a stable operation, independent of environmental parameters, and guaranteeing a certain polarisation of the laser light emitted from the laser resonator. The same applies to a waveguide laser, e.g. on chip devices in silica on silicon or silicon nitride technology.

In particular in connection with using PM fibres in the NOLM, it is preferred that the non-reciprocal optical element in total is polarisation maintaining. In this context, "in total" means that the polarisation of the light leaving the non-reciprocal optical element is the same as the polarisation of the light entering the non-reciprocal optical element. Internally, i.e. within the non-reciprocal optical element, however, the polarisation could temporarily be modified.

In order to act as a non-reciprocal phase shift element, the non-reciprocal optical element could comprise a Faraday rotator and/or at least one waveplate, for example a lambda/n waveplate, with n=2 or n=4 or n=8, i.e. a half, quarter or eighth wave plate, or a set of waveplates. Such a wave plate is an optical component which may modify the polarisation and phase of light passing through. A Faraday rotator, on the other hand, is an optical device which rotates the polarisation of lights due to the Faraday effect. The Faraday rotator constitutes a non-reciprocal optical element, because the rotation of the polarisation is doubled (not reversed) when the light passes through the medium twice in opposite directions. Alternatively, a non-reciprocal phase shift can be directly induced by an appropriate material having a Verdet constant. This material can be arranged in a waveguide guide configuration as discussed in "A design for a non-reciprocal phase shifter", Y. Okamura et al., Optical and Quantum Electronics 17 (1985) 195-199.

In order to be able to adjust the location of the transmission curve of the NOLM, in particular the value and slope of the transmission curve at zero power, it is expedient if at least one optical property of the non-reciprocal optical element is adjustable. It is most preferred if a differential phase shift imposed on the counter-propagating portions of laser passes is adjustable. This would allow to optimize the properties of the laser, in particular its self-starting properties.

In a variation of the laser according to the present invention, the bi-directional NOLM, i.e. the NOLM which comprises the non-reciprocal optical element, also comprises an amplifier and thereby constitutes a NALM. This allows to modify the nonlinearity of the NOLM. This gain may, but does not need to constitute the total gain of the laser.

Depending on the desired wavelength characteristics of the optical pulses output from the laser, fibre sections doped with Erbium, Ytterbium or Thulium or a combination thereof have been found to be advantageous for use in the amplifier within the NOLM. Other gain media such as semiconductor based optical amplifiers (SOA) or Raman amplification or Brillouin amplification can be used. The same amplifiers or amplifying media could additionally or alternatively be provided in a different section of the laser resonator, i.e. outside the NOLM.

In a particularly preferred embodiment, the amplifier has two sources for optically pumping the amplifier into opposite directions. In this arrangement, it may be possible to operate the two pump sources simultaneously or separately. In particular, the two pump sources may be configured to allow an adjustment of the ratio of pumping in the two opposite directions. In particular in connection with a non-reciprocal element in the bi-directional NOLM, the latter configuration may allow to adjust the intensity dependence of the phase shift between the counter-propagating portions of laser pulses and hence the initial slope of the NOLM transmission, as the ratio of pumping the amplifier determines the average pulse energy of a pulse in the amplifier and, hence, the optical path length.

In certain embodiments it may be advisable to have a beam splitter with a symmetric splitting ratio (i.e. 50:50) at an entry point of the NOLM. In other embodiments, a beam splitter with an asymmetric beam splitting ratio (e.g. 60:40, 70:30, 75:25 or any other desired ratio) may be preferred. An asymmetric beam splitter changes the modulation depth of the transmission curve, because the asymmetric splitting ration does not allow a complete destructive interference anymore. A similar effect may be achieved by a non-reciprocal loss element in the loop. Together with the (a)symmetry of the beam splitter, this allows to adjust modulation depth and intensity dependence independently from each other.

Even more importantly, the linear cavity section may be configured to have a variable length. To this effect, for example, a reflecting mirror of the linear cavity section may be mounted on a translation stage and/or provided with a Piezo actuator, or a length of a fibre section may be changed by stretching the fibre. Tuning or varying the cavity length will allow to vary the roundtrip time of laser pulses within the laser resonator, and to thereby vary the repetition rate of the laser. This significantly increases the flexibility of use of the laser in comparison to the fixed, limited repetition rate obtainable with a conventional figure-eight laser. In addition, higher repetition rates (e.g. in excess of 200 MHz) but also very low repetition rates (e.g. lower than 10 MHz) are achievable due to the shorter cavity length. In all embodiments of the invention, the cavity length may be changed by means of an electrooptical crystal, or by appropriately stretching a fibre section within or outside the NOLM.

Preferably, the linear cavity section comprises a mirror, an outcoupling mirror, a fibre Bragg grating and/or a free-space grating. The fibre Bragg grating serves as a highly wavelength selective reflector, for dispersion compensation and/or a pulse compression of the laser pulses within the laser resonator, while the free-space grating may be adapted as a wavelength selective reflector. Furthermore, a combination of gratings, prisms and/or mirrors may be used for dispersion compensation.

A laser device according to this invention may further comprise an electro optic crystal or modulator somewhere in the laser cavity in order to enable fast feedback. Such a device can e.g. adjust the length of the laser cavity typically with higher bandwidth than e.g. a piezo element.

A laser device as described in this invention may be used for (but is not limited to) the generation of frequency combs, the generation of THz radiation, material processing, 2-photon polymerization, seeding of parametric processes or pump probe spectroscopy. For such applications it might be useful if the output of the laser is further amplified in a fibre or free space optical amplifier. The output of a laser according to this invention, possibly amplified, can further be frequency converted with the help of nonlinear processes, such as second harmonic generation (SHG) or Raman shifting. Applications of such a frequency converted output include seeding of Ti:Sa amplifiers or two or multi-photon microscopy and spectroscopy.

Furthermore such a laser source can be employed in an asynchronous optical sampling scheme (ASOPS) or optical sampling by cavity tuning (OSCAT) based setup.

BRIEF DESCRIPTION OF THE DRAWINGS

In the following, preferred embodiments of the invention are described with respect to the accompanying drawings. In particular.

Throughout the drawings, similar components are designated with identical or similar reference numerals.

DETAILED DESCRIPTION OF THE INVENTION

Figure 1:
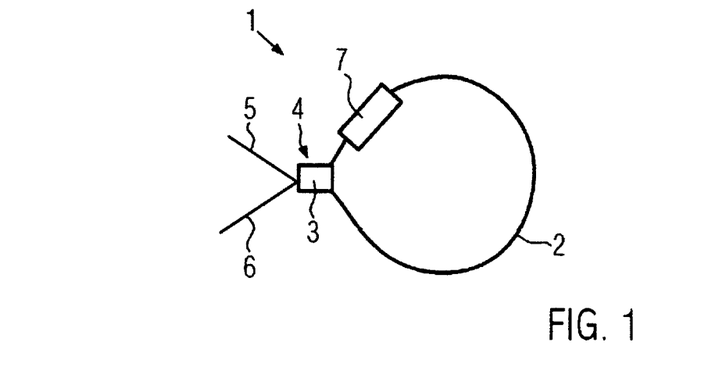
FIG. 1 is a schematic representation of a non-linear optical loop mirror (NOLM) for use in a laser according to the present invention.

FIG. 1 schematically shows a bi-directional non-linear optical loop mirror 1, NOLM, for use in a laser according to the present invention. The NOLM 1 is made up substantially from an optical fibre 2, preferably a polarisation maintaining (PM) optical fibre 2, which is bent to form essentially a loop. Alternatively, the NOLM may be configured with free-space optics. A beam splitter 3 is provided at an entry and exit point 4 of the NOLM. The entry and exit point 4 typically is the point at which the optical fibre 2 of the NOLM closes, and an incoming beam or pulse of laser light is split by the beam splitter 3 in two portions counter-propagating within the NOLM 1.

The beam splitter 3 at the entry and exit point 4 comprises a first port 5, and a second port 6. Laser pulses may be introduced into the NOLM through the first port 5 and/or through the second port 6. Each laser pulse will be split by the beam splitter 3, thereby generating two portions of the laser pulse. The NOLM 1 is adapted to guide the two portions of the laser pulse in opposite directions, and to bring them into mutual interference again at the entry and exit point 4. Hence, the NOLM is configured as a bi-directional NOLM.

FIG. 10 shows the transmission curve of a conventional NOLM, i.e. the interferometric transmission T at one of the two ports 5, 6 (output power/input power) versus the differential phase shift $\Delta\phi\_Kerr$ between the two counter-propagating laser pulses interfering with each other. The solid line is the transmission curve with a symmetric beam splitter 3. At $\Delta\phi=0$, the NOLM 2 has a reflectivity R=1 and, accordingly, a transmission T=1−R=0 from one port 5 to the other port 6. With increasing phase difference $\Delta\phi$, the transmission T oscillates between 0 and 1. The broken curve in FIG. 10, on the other hand, represents the transmission T in a situation with an asymmetric beam splitter 3. Here, the interference cannot be entirely destructive anymore. Hence, the transmission at zero phase difference has a non-zero value of about 0.16 in the present example. The maximum transmission T, however, still has a value of T=1.0. Hence, the modulation of the transmission curve has a smaller amplitude than in the situation with a symmetric beam splitter 3.

Returning to FIG. 1, the NOLM 1 for use in a laser according to the present invention differs from a conventional NOLM by comprising a non-reciprocal optical element 7 in the NOLM 1. The non-reciprocal optical element 7 has an optical influence on the laser pulse portions propagating within the NOLM which depends on the direction of the laser pulse. More importantly, this non-reciprocity of the non-reciprocal optical element 7 is passive (i.e. does not depend on an activation) and instantaneous, i.e. it is continuously present and does not depend on the exact point in time at which a laser pulse portion propagates through the non-reciprocal optical element 7. This applies to all embodiments of the present invention. Examples of non-reciprocal optical elements 7 will be discussed later.

Figure 2:
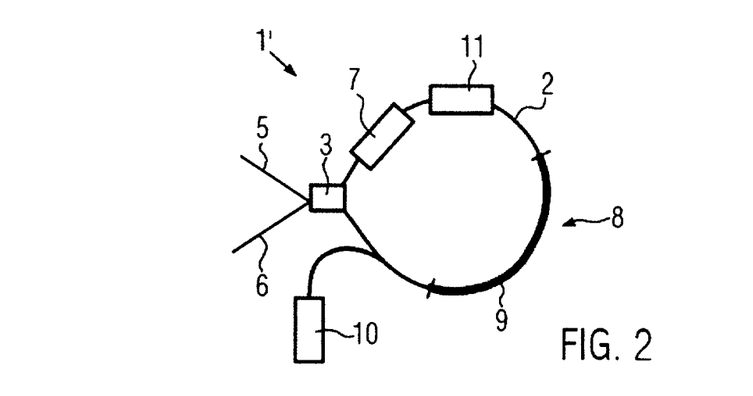
FIG. 2 is a schematic representation of a non-linear amplifying loop mirror (NALM) for use with a laser according to the present invention.

FIG. 2 shows a second embodiment of a non-linear optical loop mirror 1', NOLM, according to the present invention. In the embodiment of FIG. 2, the NOLM 1 is configured as a non-linear amplifying loop mirror 1', NALM. The basic configuration of the NALM 1' is the same as the configuration of the NOLM shown in FIG. 1. In addition, however, the NALM 1' comprises an optical amplifier 8. The amplifier 8 comprises an active fibre section 9 inserted into the NOLM fibre 2. In FIG. 2, the active fibre section 9 is represented by a thicker curve than the remainder of the NALM 1'. In addition, the optical amplifier 8 comprises a pump source 10, in particular an optical pump source 10, in order to optically pump the active fibre section 9. Depending on the desired wavelength characteristics and the primary gain medium of the laser, the active fibre section 9 may be constituted by an Erbium, Ytterbium or Thulium doped fibre. The active fibre section 9 may also constitute the gain medium of the laser.

As another difference to the NOLM 1 shown in FIG. 1, the NALM 1' of FIG. 2 further comprises a loss element 11. This loss element 11 is arranged at an asymmetrical position within the NALM 1', i.e. at differing distances to the entry and exit point 4 in the two opposite directions. In particular, it is arranged here between the non-reciprocal optical element 7 and the active fibre section 9, but it may be at any position within the NOLM 1. The loss element 11 may optionally, but not necessarily, be configured to contribute to the non-reciprocity within the NALM 1' by exhibiting a non-reciprocal loss effect. This will modify the intensity dependence of the phase difference between the counter-propagating portions of the laser pulses. In particular, the loss element 11 may be adjustable. The loss element 11 may be an outcoupler. Furthermore, the phase difference between the counter-propagating pulse portions could be adjusted by varying the amplifying properties of the amplifier 8, in particular by adjusting the power of the pump source 10.

Figure 3A:
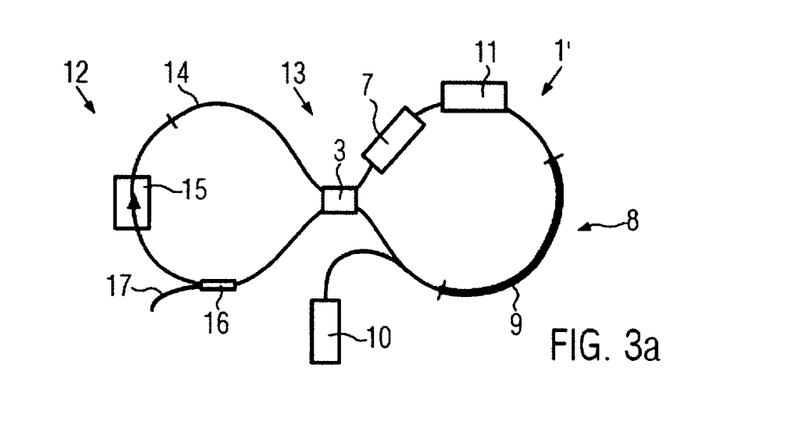
FIG. 3a shows an embodiment of a laser according to the present invention in a figure-eight configuration.

FIG. 3a shows a first embodiment of a laser 12 according to the present invention. The laser 12 is configured as a passively modelocked pulsed laser. It comprises a laser resonator 13 which, in the present embodiment, is configured in a figure-eight geometry. In more detail, the laser resonator 13 comprises a first optical loop mirror 1, 1'. In the embodiment shown in FIG. 3a, the first optical loop mirror is configured as the NALM 1' shown previously in FIG. 2, but could alternatively be configured as the NOLM 1 shown in FIG. 1. In particular, the first optical loop mirror 1, 1' comprises the non-reciprocal optical element 7.

In addition, the laser resonator 13 comprises a second optical loop 14, which connects the input 5 and output 6 ports of the loop mirrors 1, 1' and 14 to each other through a beam splitter 3. In particular, the second optical loop mirror 14 closes an optical path between the first and second ports 5, 6 of the beam splitter 3, c.f. FIGS. 1 and 2. The gain element of the laser may be arranged in the second optical loop mirror 14.

As discussed previously, the first optical loop mirror 1, 1' is configured as a bi-directional non-linear optical loop mirror, allowing counter-propagation of portions of laser pulses in order to bring these laser pulse portions into interference with each other at the beam splitter 3. The second optical loop 14, on the other hand, is configured as a unidirectional loop mirror by comprising an optical isolator 15. The optical isolator 15 allows the passage of laser pulses only in one direction, while blocking light in the opposite direction. Further, the second optical loop 14 comprises an output coupler 16. The output coupler 16 is a fibre optic coupler which couples out a portion of the laser pulses from the resonator 13 to an output port 17 of the laser 12.

The laser resonator 13 of the laser 12 has a fibre optic configuration. Both optical loop mirrors 1, 1' and 14 are made from light guiding optical fibre, in particular from polarisation maintaining (PM) fibre.

Due to having the non-reciprocal optical element 7 inserted in the first optical loop mirror 1, 1', the laser 12 constantly experiences a linear phase offset between counter-propagating pulses in the bi-directional loop mirror 1, 1', thereby significantly enhancing self-starting capabilities of the laser 12 and allowing it to be operated in a wide range of net dispersion, from far normal to far anomalous dispersion. The phase shift may be fixed or adjustable during operation and may be combined with other means to modify the operation parameters of the laser, such as polarisation, output power or wavelength.

Figure 3B:
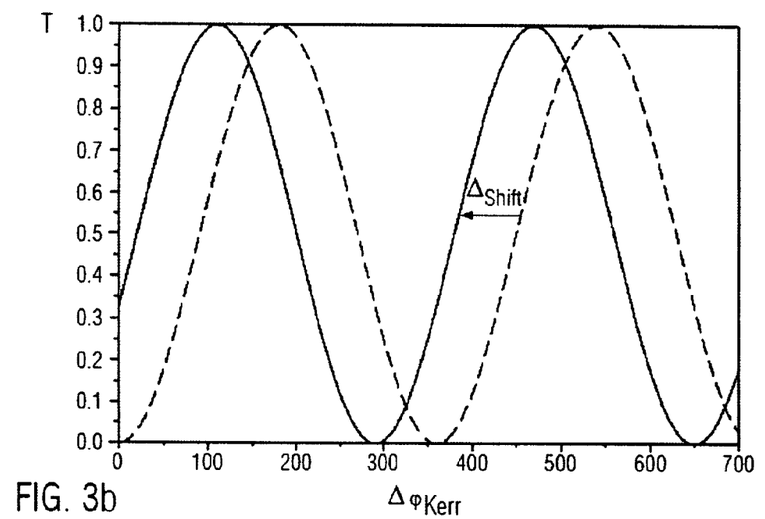
FIG. 3b shows the transmission curve of the laser according to the invention in comparison to a conventional figure-eight laser.

FIG. 3b shows the interferometric transmission T of the laser 12 of FIG. 3a, in particular its first non-linear optical loop mirror 1, 1', as a function of the differential phase $\Delta\phi_{Kerr}$ in a solid line, when a symmetric beam splitter 3 is employed, i.e. a beam splitter with a 50:50 beam splitting ratio. The symmetry of the beam splitter 3 leads to a modulation depth of the transmission function between 0.0 and 1.0. For comparison, FIG. 3b shows the transmission function of a conventional non-linear optical loop mirror (i.e. without a non-reciprocal optical element 7) in a dashed line. It can be seen that the transmission function of the conventional optical loop mirror has a vanishing slope and the value is T=0.0 at zero phase difference. The transmission function T of the laser 12 according to the present invention, however, is obtained by shifting the conventional transmission function to the left by a value $\Delta_{shift}$ of 70°. This value $\Delta_{shift}$ is the differential phase shift introduced by the non-reciprocal phase shift optical element 7.

Figure 3C:
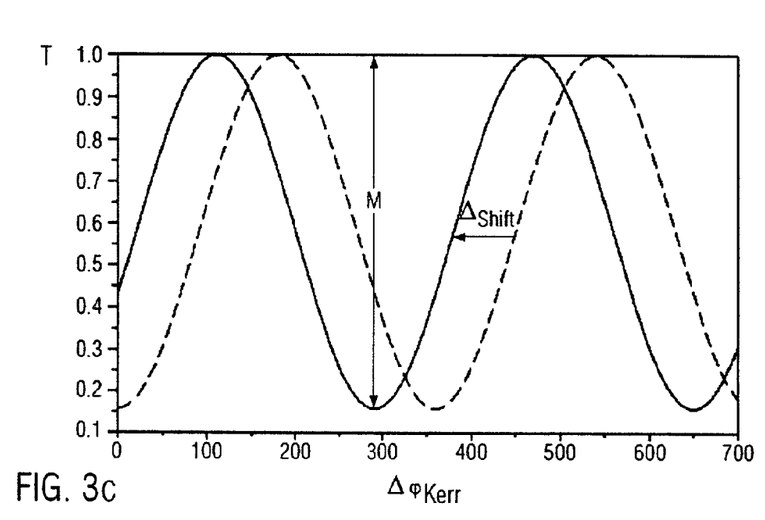
FIG. 3c shows the transmission curve of a laser according to the present invention with an asymmetric beam splitter in comparison to a conventional figure-eight laser.

FIG. 3c shows the transmission functions of the conventional optical loop mirror (in a broken line) and the NOLM 1 or NALM 1' of the present invention (in a solid line) in a situation with an asymmetrical beam splitter 3 between the two loop mirrors 1, 1' and 14. In particular, FIG. 3c shows the situation with a beam splitter 3 having a splitting ratio of 70:30. The effect of this asymmetry of the beam splitter 3 is a decrease in the modulation depth M of the transmission function T. While the transmission T oscillated between 0.0 and 1.0 with a symmetric beam splitter 3 (FIG. 3b), it now oscillates merely between 0.16 and 1.0 with the 70:30 beam splitter 3. Hence, the modulation depth M decreased from 1.0 to 0.84. Again, however, FIG. 3c shows that the transmission function T of the laser 12 according to the invention is obtained by shifting the conventional transmission function to the left by $\Delta_{shift}=70°$.

In both situations shown in FIGS. 3b and 3c, it will be appreciated that the transmission function T at $\Delta\phi=0$ has a non-zero value and a non-vanishing slope. This is the criterion to be fulfilled in order to guarantee efficient self-starting of the laser 12, i.e. self-starting of the pulsed operation of the laser 12.

Figure 4A:
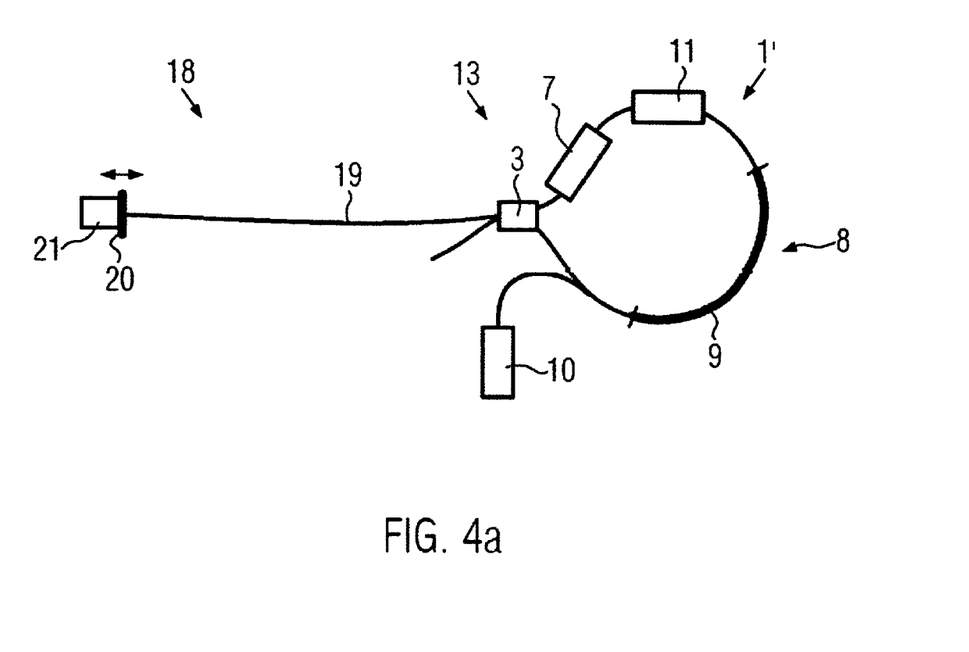
FIG. 4a shows an embodiment of a laser according to the present invention in a figure-nine configuration.

FIG. 4a shows a second embodiment of a laser 18 according to the present invention. This laser 18 again has a laser resonator 13 comprising a first optical loop mirror, which may be configured as a NOLM 1 or (as shown in FIG. 4a) as a NALM 1'. Instead of having a second optical loop mirror 14, however, the laser resonator 13 of the laser 18 comprises a linear cavity section 19. This linear cavity section 19 extends between the beam splitter 3 and a reflecting element 20. Due to the combination of an optical loop mirror 1, 1' with a linear cavity section 19, the laser resonator 13 may be designated as having a figure-nine geometry or configuration. The linear cavity section 19 may be configured as a free space cavity section, or as a fibre optic cavity section with an optical fibre between the beam splitter 3 and the reflecting element 20. The reflecting element 20 may be an outcoupler mirror, a mirror, a grating or a dispersion compensator.

As discussed below, the configuration shown in FIG. 4a is only the basic configuration of the laser 18. Further optical elements such as an outcoupler, a gain medium, a wavelength filter, a polarisation controller, a wavelength converter and/or a dispersion controller may be introduced into the linear cavity section 19, in particular when the linear cavity section 19 is a free space cavity section 19. Moreover, in the embodiment of FIG. 4a and/or other figure-nine configurations of the laser 18 according to the present invention, the length of the linear cavity section 19 may be adjustable. In the present embodiment, this is achieved by mounting the reflecting element 20 on a translation stage or voice coil or Piezo actuator 21 which is adapted to move the reflecting mirror 20 back and forth in a controlled manner in the axial direction of the linear cavity section 19. This movement of the reflecting mirror 20 is represented by a double arrow in FIG. 4a. A shorter length of the linear cavity section 19 will reduce the roundtrip time of laser pulses in the laser resonator 13 and correspondingly increase the repetition rate, and vice versa.

In comparison to the figure-eight geometry shown in FIG. 3a, the figure-nine geometry of the laser resonator 13 in FIG. 4a has the advantages of requiring a shorter fibre optic path, easier access into the laser resonator 13 for wavelength filtering, dispersion compensation, etc., higher achievable repetition rates and, with adjustability of the length of the linear cavity section 19, the possibility of cavity length tuning and repetition rate tuning.

Figure 4B:
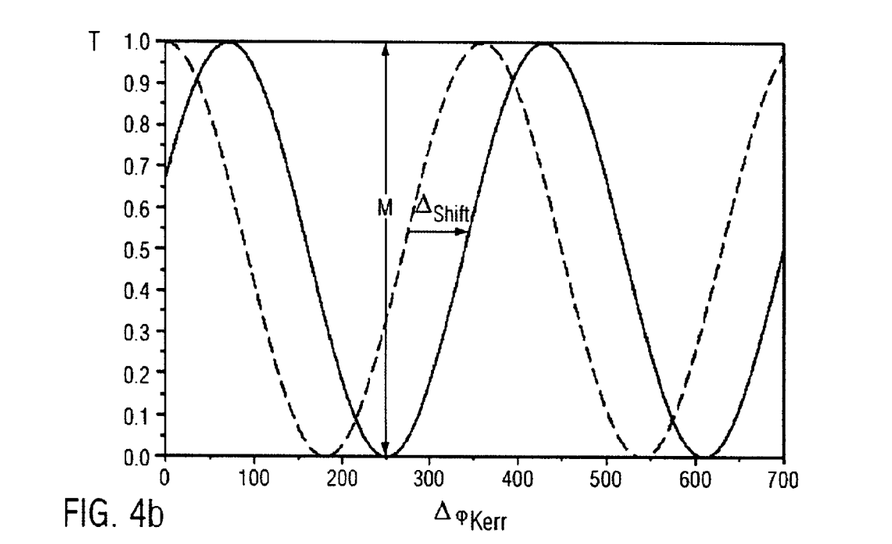
FIG. 4b shows the transmission curve of the laser according to FIG. 4a with and without a non-reciprocal element.

FIG. 4b shows the transmission T of the laser 18, in particular the transmission T of its optical loop mirror 1' (solid line) in comparison to the transmission T of a conventional loop mirror (broken line) as a function of the phase difference $\Delta\phi_{Kerr}$. In particular, FIG. 4b shows the situation with a symmetric beam splitter 3 in the laser resonator 13, which leads to a full modulation depth M between 0.0 and 1.0. As evident from FIG. 4b, the transmission function T of the conventional loop mirror has a value of 1.0 at $\Delta\phi=0$, but a vanishing slope. The transmission function T according to the present invention, on the other hand, is obtained by a shift of $\Delta_{shift}=70°$ to the right from the conventional transmission function. This leads to both a non-zero value, and a non-vanishing slope of the transmission function T at $\Delta\phi=0$. This shift of the transmission function T is effected by the non-reciprocal optical element 7 in the optical loop mirror 1'.

Figure 4C:
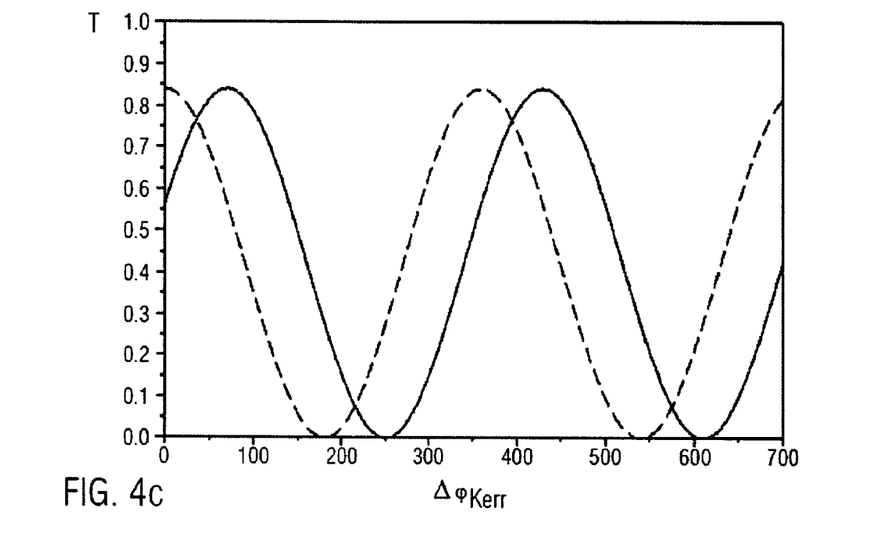
FIG. 4c shows the transmission curve of the figure-nine laser according to FIG. 4a with an asymmetric beam splitter with and without a non-reciprocal element.

FIG. 4c shows the same transmission functions T as in FIG. 4b, but this time in the situation of an asymmetric 70:30 beam splitter 3 being installed in the laser resonator 13.

As evident from FIG. 4c, this corresponds to an overall loss of 16% and reduces the amplitude of the transmission function to a value of about 0.84.

Figure 5A:
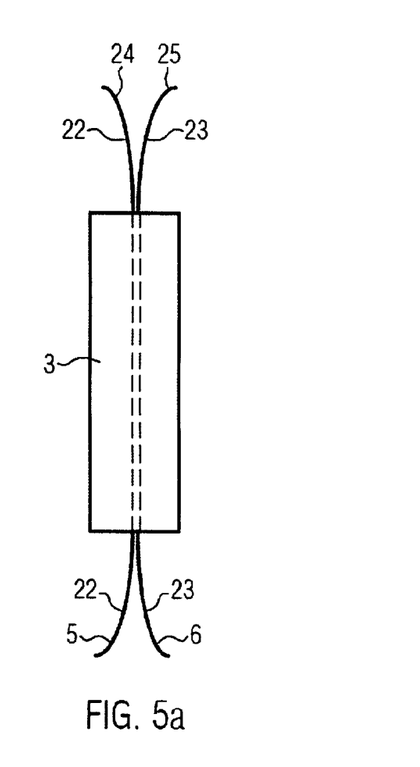
FIG. 5a is a schematic representation of a beam splitter for use in a laser according to the present invention.

FIG. 5a is a schematic representation of the beam splitter 3 in the laser resonator 13 of the laser 12, 18. As discussed previously, the beam splitter 3 may be configured as a fibre optic coupler in which a first optical fibre 22 and a second optical fibre 23 each pass through the fibre optic coupler and are brought at a close enough distance in order to allow a coupling of laser light from one fibre 22 to the other fibre 23, and vice versa. The distance between the two fibres 22, 23 may even be adjustable in order to allow the coupling or beam splitting ratio of the beam splitter 3. Both fibres 22, 23 may be polarisation maintaining fibres. As evident from FIG. 5a, the beam splitter 3 has a first port 5 and a second port 6. These two ports 5, 6 may be closed by the second optical loop mirror 14, as shown in FIG. 3, or one of the two ports 5, 6 may be used for the linear cavity section 19, as shown in FIG. 4a. The beam splitter 3 has two further ports 24, 25 which are closed by the first optical loop mirror 1, 1'.

Figure 5B:
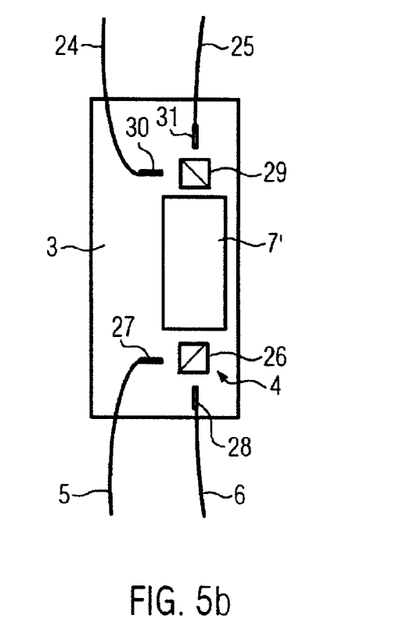
FIG. 5b shows another embodiment of a beam splitter.

FIG. 5b shows another embodiment of the beam splitter 3 for use in the laser resonator 13 of the lasers 12 or 18 according to the present invention. In this embodiment, the beam splitter 3 comprises a first polarising beam splitter 26. Each of the first and second ports 5, 6 comprise an optical fibre, the proximal end of which (from the perspective of the beam splitter 3) being located in a collimating optics 27, 28, respectively, converting the light guided in the optical fibre to a collimated free space beam and vice versa. The first polarising beam splitter 26 may be defined as the entry and exit point 4 of the first optical loop mirror 1, 1', because it is here that the laser pulse portions counter-propagating through the NOLM 1, 1' interfere.

In the embodiment of FIG. 5b, the beam splitter 3 further comprises a second polarising beam splitter 29. The ports 24, 25 of the beam splitter 3 directed to the first optical loop mirror 1, 1' are again each constituted by a section of a PM fibre, the proximal end of which being provided with a collimating optics 30, 31. Between the two polarising beam splitters (PBS) 26, 29, the beam splitter 3 itself accommodates a non-reciprocal optical element 7'. This non-reciprocal optical element 7' may be provided in addition to a non-reciprocal optical element 7 in the fibre optical part of the non-linear optical loop mirror 1, 1', or replace the non-reciprocal optical element 7 in the fibre optical part of the NOLM/NALM 1, 1'. The non-reciprocal optical element 7' may be polarisation-sensitive and/or direction-sensitive and/or polarising. For example, it may comprise one or several waveplates, one or several Faraday rotators or combinations thereof, preferably containing adjustable parts. Specific examples will be discussed below. It is to be understood that any of the four ports of this beam splitter may be executed as free-space optic without fibre coupling and may even be dumped.

Figure 5C:
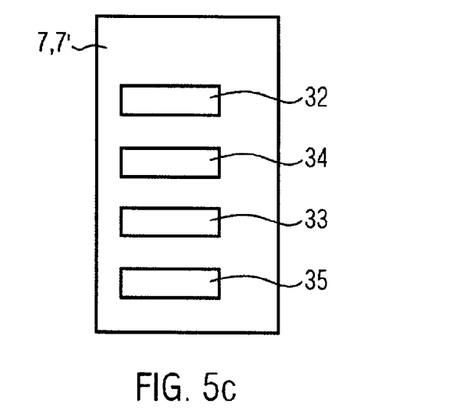
FIG. 5c shows a non-reciprocal element for use in a beam splitter according to FIG. 5b.

FIG. 5c shows a first example of the internal components of the non-reciprocal element 7 inserted into the NOLM/NALM 1, 1', or the non-reciprocal optical element 7' within the beam splitter 3. In this embodiment, the non-reciprocal optical element 7, 7' comprises a first Faraday rotator 32 and a second Faraday rotator 33, as well as a phase shift element 34 positioned between the two Faraday rotators 32, 33. This phase shift element 34 induces a phase shift on a portion of a laser pulse which depends on the polarisation state of the laser pulse. This polarisation, in turn, depends on the direction of the laser pulse, as the laser pulse either passes through the first Faraday rotator 32, or through the second Faraday rotator 33 before reaching the phase shift element 34. In advantageous embodiments, the phase shift element 34 will be adjustable with respect to its phase shifting properties. For example, it may be an electro optic modulator (EOM) or a waveplate or a combination of a half waveplate between two quarter waveplates, preferably with the waveplate or half waveplate being rotatable in order to adjust the influence of the phase shift element on the polarisation of light passing through. Optionally, the non-reciprocal optical element 7, 7' may further comprise a separate half waveplate 35 in order to be able to adjust the polarisation of light passing through. In certain configurations, the non-reciprocal optical element in total is polarisation maintaining, i.e. light entering the non-reciprocal element 7, 7' with a specific polarisation leaves the non-reciprocal element 7, 7' with the same polarisation.

Figure 5D:
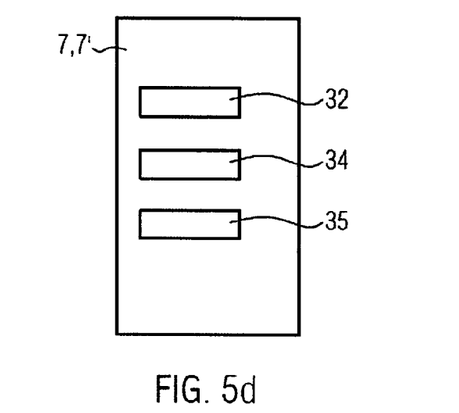
FIG. 5d shows another embodiment of a non-reciprocal optical element.

FIG. 5d shows another embodiment of a non-reciprocal optical element 7, 7'. In contrast to the previous embodiment, the non-reciprocal optical element 7, 7' of FIG. 5d merely has a single Faraday rotator 32 as well as a phase shift element 34, but no second Faraday rotator. Again, the non-reciprocal optical element 7, 7' may optionally comprise a half waveplate 35 in order to be able to adjust the polarisation.

Figure 6:
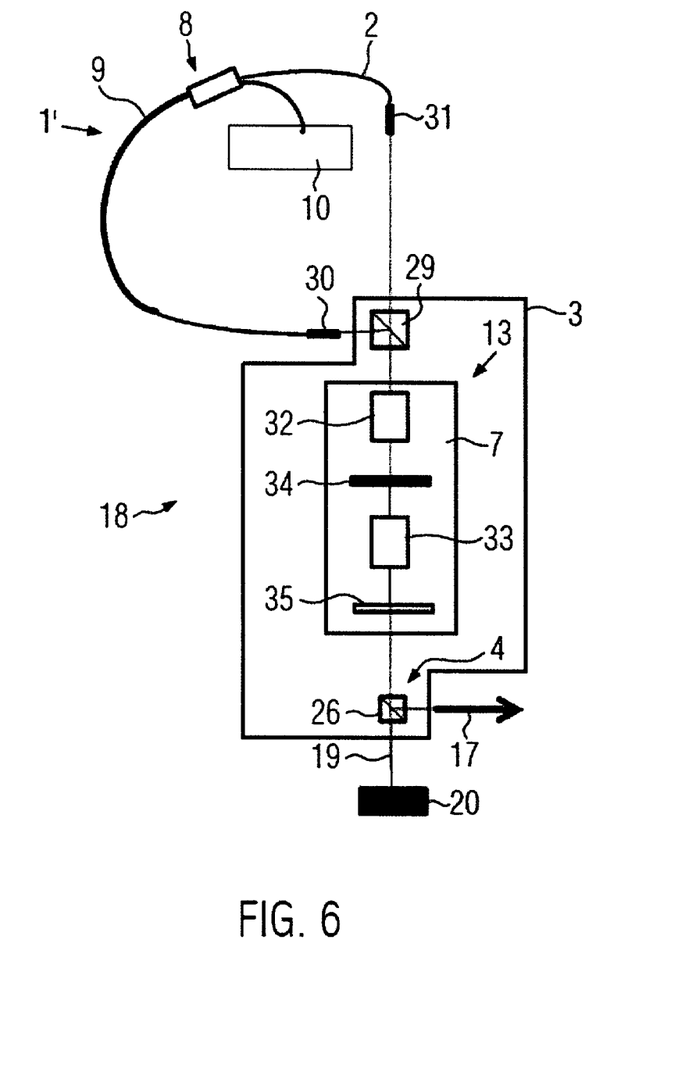
FIG. 6 shows another embodiment of a laser according to the invention with a figure-nine configuration.

FIG. 6 shows another embodiment of a laser 18 of the present invention in a figure-nine configuration. The laser 18 comprises a resonator 13 which, in turn, comprises a NALM 1' as well as a linear cavity section 19, combined by a beam splitter arrangement 3. The NALM 1' comprises an amplifier or gain element 8 with an active fibre section 9 optically pumped from only one side by a pump source 10. The two ends of the optical fibre 2 of the NALM 1' are accommodated in collimating optics 30, 31, respectively, which are each facing one side of the beam splitter 3.

In this embodiment, the linear cavity section 19 is configured as a free space section without the use of optical fibres. The beam splitter arrangement 3 comprises—from bottom to top—a first polarising beam splitter (PBS) 26, a half wave plate 35 as an optional element, a first Faraday rotator 33, a phase shift element 34 (such as an EOM or a waveplate), a second Faraday rotator 32, and a second polarising beam splitter 29. The first PBS 26 is the entry/exit point 4 into the NOLM loop and constitutes the point where the interference of the two counter-propagating pulses takes place. In the embodiment shown in FIG. 6, the Faraday rotators 32, 33, the phase shift element 34 and the (optional) waveplate 35 together constitute a non-reciprocal optical element 7'. The non-reciprocal optical element 7' is part of a beam splitter arrangement 3, which is similar to the beam splitter arrangement shown in FIGS. 5b, 5c. At the first PBS 26, the two portions of the laser pulses counter-propagating through the NOLM 1' interfere with each other. Hence, this PBS or output coupler 26 can be defined as the entry/exit point 4 of the NOLM 1'. The linear cavity section 19 extends between the PBS or output coupler 26 and the reflecting element 20. The NOLM 1', on the other hand, comprises both a loop section beyond the second PBS 29, as well as a linear section between the two polarizing beam splitters 26 and 29. On this linear section, on which the non-reciprocal optical element 7' is arranged, the portions of the laser pulses counter-propagating through the loop section of the NOLM 1' travel collinearly.

Figures 7A, 7B:
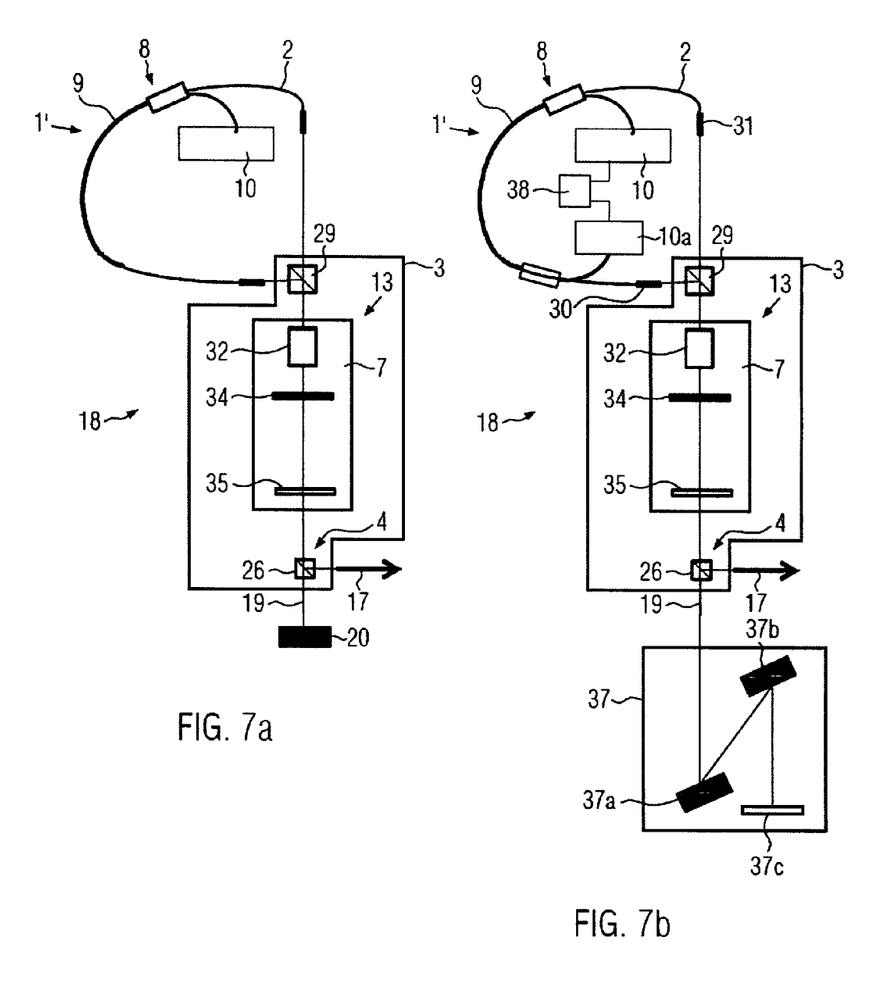
FIG. 7a shows a third embodiment of a laser according to the invention with a figure-nine configuration.
FIG. 7b shows a fourth embodiment of a laser according to the invention in a figure-nine configuration.

FIG. 7a shows a variation of the laser 18 presented in FIG. 6. In particular, the laser 18 of FIG. 7a differs from the laser 18 of FIG. 6 in avoiding a second Faraday rotator 33 in the non-reciprocal optical element 7. Apart from this amendment, however, the configuration of the laser 18 was not modified.

FIG. 7b shows another embodiment of a laser 18 according to the present invention in a figure-nine configuration. The embodiment of FIG. 7b differs from the embodiment of the laser 18 of FIG. 7a in having the reflecting element 20 replaced by a dispersion compensator (pulse compressor) 37 comprising a combination of two gratings 37a, 37b and a reflecting mirror 37c.

As another difference compared to all previous embodiments of a laser 12, 18 with a NALM 1', the amplifier 8 in the NALM 1' now has two pump sources 10, 10a, which are configured to pump the active fibre 9 of the amplifier 8 in opposite directions. Further, a control 38 is provided and connected to the two pump sources 10, 10a. The control 38 is able to adjust the ratio of pumping from the two optical pump sources 10, 10a. By varying the ratio of pumping, the phase difference of the laser pulse portions propagating through the NALM 1' is adjustable. Like the other modifications between the different embodiments, the two-sided pumping of the amplifier 8 may also be provided in each of the previously discussed embodiments of a laser 12, 18 with a NALM 1'.

Figure 8A:
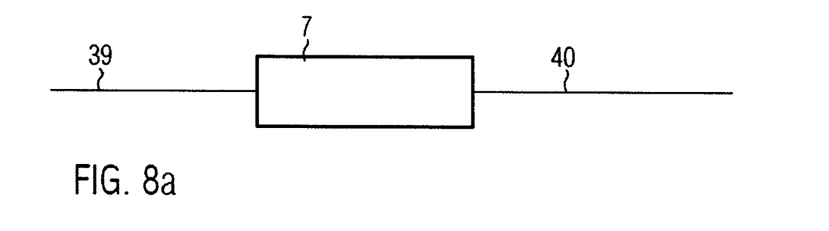
FIGS. 8a-8d show schematic representations of different embodiments of non-reciprocal optical elements for use in a laser according to the present invention.

FIG. 8a schematically shows a non-reciprocal phase shifter as a specific embodiment of a non-reciprocal optical element 7. This phase shifter 7 is configured in a fibre optic manner and comprises a first port 39, and a second port 40. By appropriately connecting the ports 39, 40 with the optical fibre 2 of the NOLM/NALM 1, 1', the non-reciprocal phase shifter may be inserted into the NOLM/NALM.

Figure 8B:
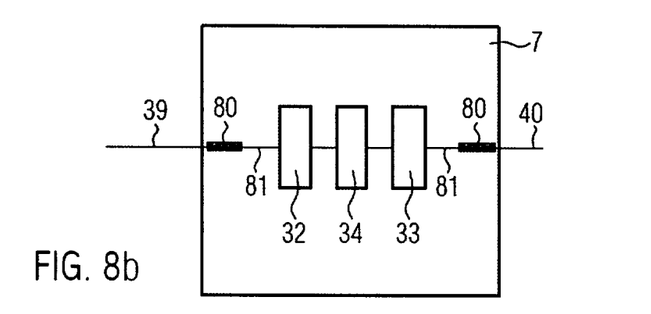

FIG. 8b shows another embodiment of a non-reciprocal optical element 7 in a fibre optic configuration. In this embodiment, the non-reciprocal optical element 7 comprises a first Faraday rotator 32, a second Faraday rotator 33, as well as a polarisation dependent phase shift element 34 interposed between the two Faraday rotators 32, 33. The non-reciprocal optical element 7 has a first port 39 and a second port 40. Each port 39, 40 leads to a collimating optics 80. The Faraday rotators 32, 33 and the phase shift element 34 are located on a free-space section 81 which extends between the two collimating optics 80.

Figure 8C:
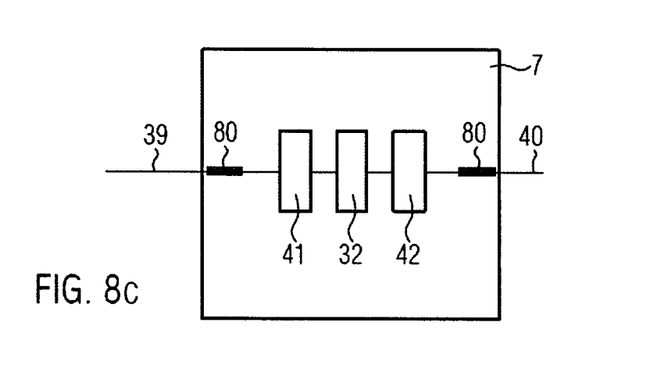

FIG. 8c shows another embodiment of a non-reciprocal optical element 7. In this embodiment, the non-reciprocal optical element 7 comprises two quarter waveplates 41, 42, as well as a single Faraday rotator 32 interposed between the two quarter waveplates 41, 42. Again, all the polarisation influencing optical components 32, 41, 42 of the non-reciprocal optical element 7 are arranged on a free-space section 81 between a first port 39 and a second port 40.

Figure 8D:
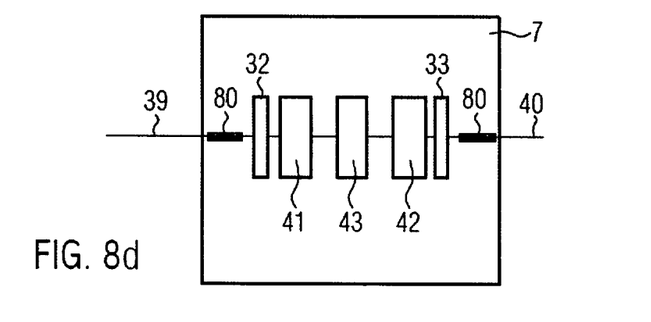

FIG. 8d shows another embodiment of a non-reciprocal optical element 7. In this embodiment, the non-reciprocal optical element 7 comprises two quarter waveplates 41, 42, and a half waveplate 43 interposed between the two quarter waveplates 41, 42, as well as two Faraday rotators 32, 33 enclosing the interposed set of waveplates. Again, all the polarisation influencing optical components 32, 33, and 41 to 43 of the non-reciprocal optical element 7 are arranged between a first port 39 and a second port 40, in particular on a free-space section 81 between two collimating optics 80.

The beam splitter arrangement 3 of FIG. 5b and in particular its non-reciprocal element 7, 7' may have an even or odd number of Faraday rotators.

Figure 11:
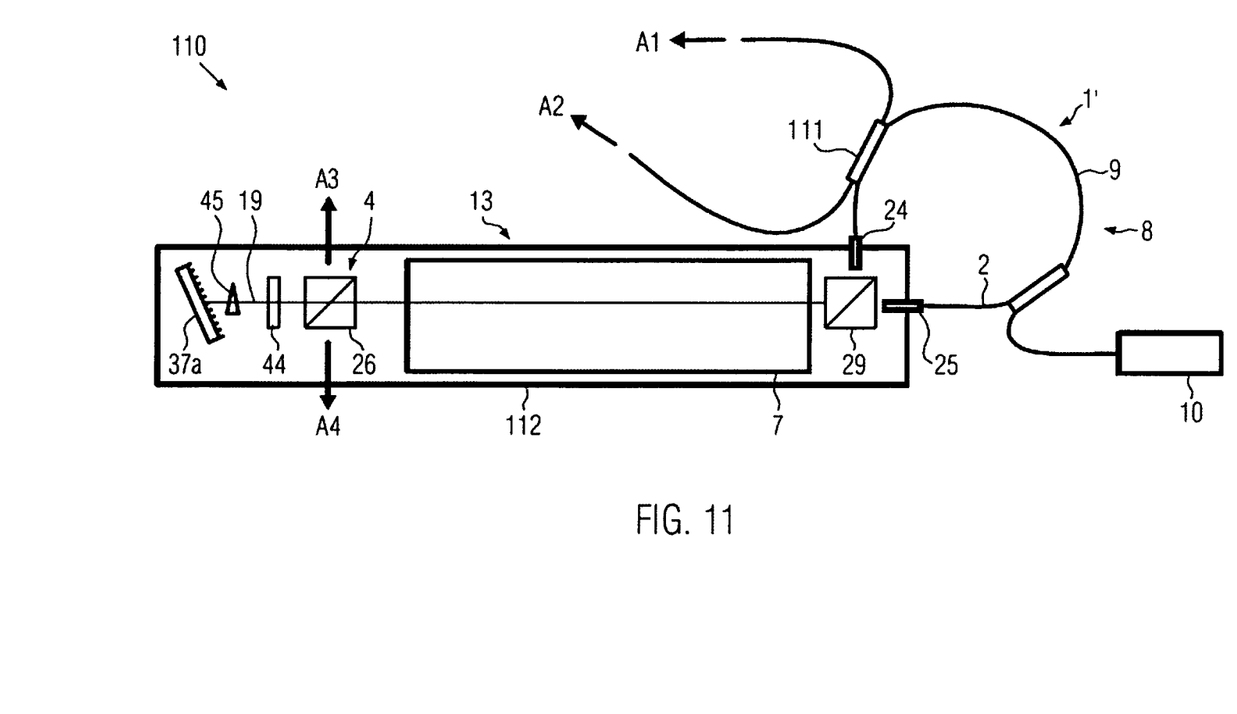
FIG. 11 shows a schematic view of a laser according to an embodiment of the invention.

FIG. 11 shows a schematical representation of a laser 110 of the present invention. The laser resonator 13 of this laser 110 comprises a linear cavity section 19, and additionally a NOLM 1'. In fact, as the NOLM comprises an amplifier 8 with a doped fiber section 9 and a pump laser 10, it may be designated as a non-linear amplifying loop mirror, NALM.

In this configuration, the NOLM/NALM 1' comprises a loop section as well as a linear section. The linear section is defined between a first polarising beam splitter 26 constituting the exit point 4 of the NOLM/NALM 1', and a second polarising beam splitter 29 where the loop section of the NOLM/NALM begins. The first polarising beam splitter 26 constitutes the exit point 4 of the NOLM/NALM 1', because it is here where the counter-propagating pulse portions interfere with each other. All fibers 2 in the loop section of the NOLM/NALM 1' are polarisation maintaining optical fibers.

A non-reciprocal optical element 7 is arranged on the linear section of the NOLM/NALM 1'. In the present embodiment, the non-reciprocal element 7 comprises a Faraday rotator, and an arrangement of waveplates.

A fiber coupler 111 is arranged within the loop section within the NOLM/NALM 1'. In the present embodiment this fiber coupler 111, which may have a coupling efficiency of 30% or less, provides two output ports A1, A2. However, in a different embodiment, the fiber coupler 111 may only have one output port, for example the output port A1.

On the rather short linear cavity section 19 of the laser resonator 13, two optical elements are provided, namely a quarter wave plate 44 with an adjustable angle, as well as a filter or grating 37a. The grating 37a may be replaced by a simple mirror, or by a mirror together with a dielectric band-pass filter or a fiber Bragg grating (FBG). The grating 37a may have a filtering bandwidth (FWHM) of about 8 nm, and may be constituted as a grating with 300 lines/millimeters. The filtering bandwidth is adjustable by selecting the number of illuminated grating lines. The grating 37a (or more generally, the optical band pass filter) merely acts as a wavelength filter and does not provide any dispersion compensation. If dispersion compensation is desired, this could be achieved by replacing the grating 37a e.g. by a chirped fiber Bragg grating, or by providing additional dispersion compensating elements, for example a prism pair, or by providing a combination of normally and anomalously dispersive fiber within the loop section of the NOLM1'. The quarter wave plate 44 is optional. Its purpose is to be able to adjust the output power of the laser 110.

In this embodiment of the invention, the optical elements of the linear cavity section 19 (i.e. the quarter wave plate 44 and the grating 37a) as well as the optical components of the linear section of the NOLM (i.e. both polarizing beam splitters 26, 29, as well as the components of the non-reciprocal optical element 7) are each constituted in the form of micro optical elements. Further, these optical components are jointly assembled on a micro optical bench 112, or within a common cylindrical carrier 112. If a micro bench 112 is used, this may be a ceramical substrate.

This configuration of the linear cavity section 19 and the linear section of the NOLM in the form of micro optics together with a free space section leads to a very compact size of the laser 110, thereby achieving both a robust design and very high repetition rates of e.g. 200 MHz or more.

If the micro optical components are assembled within a common cylindrical carrier 112, this carrier 112 may be made from stainless steel or glass, and may have a length of 5 cm, and a diameter of 8 mm.

Laser radiation from the laser resonator 13 may be output from one or two output ports A1, A2 at the fiber coupler 111, and/or from one or two output ports A3, A4 at the first polarizing beam splitter 26, i.e. at the exit point 4 of the NOLM/NALM. The laser 110 may even be configured to allow a selection of the output port(s) for the operator.

The output port A1 is located on the same side of the fiber coupler 111 as the optical amplifier 8, whereas the second output port A2 is located on the opposite side of the fiber coupler 111. The output port A3 receives and provides light coming from the linear cavity section 19, whereas the output port A4 receives and provides light coming from the NOLM/NALM1'. At the output ports A1, A3, laser radiation will be provided which has previously been subjected to a wavelength filtering by the filter/grating 37a, without any further amplification of this radiation again after the filtering. On the other hand, the radiation which is provided at the output ports A2, A4 is laser radiation which has been amplified by the optical amplifier 8, and which has not yet been subjected to wavelength filtering by the filter/grating 37a. Hence, the spectrum of the laser radiation at the output ports A1, A3 is narrower and has less noise, while the laser radiation which can be provided at the other output ports A2, A4 has a broader spectrum and a higher power.

The amplifying optical fiber section 9 of the amplifier 8 may be doped with ytterbium, or with any other (combination of) rare earth elements. At the grating, longer wavelengths are diffracted more than shorter wavelengths. Therefore inserting an optional wedge shaped glass 45 into the beam path in front of the grating will introduce anomalous dispersion and allows to fine tune the overall cavity dispersion. This can also be achieved by introducing fibers with different dispersion signs (normal/anomalous) in the NALM part of the laser.

Starting from the embodiment shown in FIG. 11, the laser 110 may be re-configured in several ways, in particular by using any of the features described with respect to any of the preceding embodiments. The linear cavity section 19 may have an adjustable optical path length, in order to be able to vary the pulse repetition rate.

The invention claimed is:

1. A laser with a laser resonator, the laser resonator comprising a non-linear optical loop mirror, NOLM, which is adapted to guide counter-propagating portions of laser pulses, and to bring the counter-propagating portions of laser pulses into interference with each other at an exit point of the NOLM, wherein the non-linear optical loop mirror comprises a non-reciprocal optical element, and, in addition to the NOLM, the laser resonator comprises a linear cavity section, optical components of the linear cavity section of the laser resonator are provided in the form of microoptical elements and are either assembled within a common, cylindrical carrier, or are assembled on a common micro-bench.

2. The laser according to claim 1, wherein the micro-bench is a ceramic substrate.

3. The laser according to claim 1, wherein the cylindrical carrier comprises stainless steel or glass.

4. The laser according to claim 1, wherein the cylindrical carrier has a length of 0.5 cm to 10 cm and/or an internal or external diameter of 5 mm to 12 mm.

5. The laser according to claim 4, wherein the cylindrical carrier has a length of 5 cm and an internal or external diameter of 8 mm.

6. The laser according to claim 1, wherein the non-reciprocal optical element comprises at least one Faraday rotator and/or at least one waveplate.

7. The laser according to claim 1, wherein the bi-directional NOLM comprises an amplifier.

8. The laser according to claim 1, wherein the linear cavity section comprises a reflecting element, an outcoupling mirror, a Bragg grating, a dispersion compensator and/or a free-space grating.

9. The laser according to claim 1, further comprising a fiber coupler arranged within the loop section of the NOLM for providing at least one output port of the laser.

10. The laser according to claim 9, wherein the output port of the laser is selectable from at least one output port at the fiber coupler within the loop section of the NOLM and one or two output ports at a polarising beam splitter at the exit point of the NOLM.

11. The laser according to claim 1, wherein a repetition rate of the laser is 200 MHz or higher.

12. The laser according to claim 11, wherein the repetition rate is 250 MHz or higher.

13. The laser according to claim 1, wherein a repetition rate of the laser is adjustable.

14. The laser according to claim 13, wherein the laser comprises a stretchable fibre section in the laser resonator and/or the linear cavity section comprises a variable optical path length.

15. The laser according to claim 1, wherein the NOLM comprises a loop section as well as a linear section on which the laser pulse portions counter-propagating through the NOLM travel collinearly, with the non-reciprocal optical element being arranged in the linear section of the NOLM.

16. The laser according to claim 15, wherein all fibers in the loop section of the NOLM are polarisation maintaining optical fibers.

17. The laser according to claim 15, wherein optical components on the linear section of the NOLM are provided in the form of microoptical elements and are either assembled within a common, cylindrical carrier, or are assembled on a common micro-bench.

18. The laser according to claim 17, wherein optical components on the linear section of the NOLM are provided assembled within the same cylindrical carrier as the optical components on the linear cavity section, or are assembled on the same common micro-bench as the optical components on the linear cavity section.

19. The laser according to claim 1, wherein the NOLM comprises a loop section and a linear section on which the laser pulse portions counter-propagating through the NOLM travel collinearly, wherein optical components on the linear section of the NOLM are provided in the form of microoptical elements and are assembled within the same cylindrical carrier as the optical components on the linear cavity section or are assembled on the same common micro-bench as the optical components on the linear cavity section of the laser resonator.

20. The laser according to claim 19, wherein the linear section of the NOLM is collinear with the linear cavity section of the laser resonator.

\* \* \* \* \*